(12) United States Patent
Finnegan et al.

(10) Patent No.: US 7,876,923 B2
(45) Date of Patent: Jan. 25, 2011

(54) LOUDSPEAKER GASKETING

(76) Inventors: Brendan J. Finnegan, c/o Bose Corporation, The Mountain, Framingham, MA (US) 01701; Donald S. Joyner, c/o Bose Corporation, The Mountain, Framingham, MA (US) 01701; Lawrence D. Van Etten, c/o Bose Corporation, The Mountain, Framingham, MA (US) 01701

( * ) Notice: Subject to any disclaimer, the term of this patent is extended or adjusted under 35 U.S.C. 154(b) by 1346 days.

(21) Appl. No.: 11/364,778

(22) Filed: Feb. 27, 2006

(65) Prior Publication Data

US 2007/0204462 A1 Sep. 6, 2007

(51) Int. Cl.
H04R 25/00 (2006.01)
(52) U.S. Cl. .................... 381/398; 381/386; 29/594
(58) Field of Classification Search ............. 381/353, 381/354, 386, 392, 398, 403, 189; 264/45.5, 264/46.4, 154, 252; 29/594, 609.1; 181/171, 181/172, 141
See application file for complete search history.

(56) References Cited

U.S. PATENT DOCUMENTS

| | | | |
|---|---|---|---|
| 3,612,783 A | 10/1971 | Schneider et al. | |
| 4,029,911 A * | 6/1977 | Albinger | 381/398 |
| 4,191,865 A | 3/1980 | King et al. | |
| 4,550,429 A | 10/1985 | Burbank et al. | |
| 4,565,905 A | 1/1986 | Nation | |
| 4,653,607 A | 3/1987 | Bage | |
| 5,650,105 A * | 7/1997 | Yocum | 264/45.5 |
| 5,705,108 A | 1/1998 | Nonogaki et al. | |
| 5,739,481 A | 4/1998 | Baumhauer, Jr. et al. | |
| 5,740,264 A | 4/1998 | Kojima | |
| 6,058,199 A | 5/2000 | Umitsu | |
| 6,118,884 A * | 9/2000 | Proni | 381/403 |
| 6,171,534 B1 | 1/2001 | Leach et al. | |
| 6,224,801 B1 * | 5/2001 | Mango, III | 264/154 |
| 6,457,547 B2 | 10/2002 | Novitschitsch | |
| 6,661,902 B1 | 12/2003 | Ziegler et al. | |
| 2001/0002632 A1 | 6/2001 | Novitschitsch | |
| 2001/0040283 A1 | 11/2001 | Konishi et al. | |
| 2004/0018269 A1 | 1/2004 | Carlson et al. | |
| 2004/0062407 A1 | 4/2004 | Ziegler et al. | |

(Continued)

FOREIGN PATENT DOCUMENTS

DE 27 38 526 10/1978

(Continued)

OTHER PUBLICATIONS

International Preliminary Report on Patentability dated Dec. 31, 2008, issued in International Application No. PCT/US2007/062053, filed Feb. 27, 2007.

(Continued)

*Primary Examiner*—Huyen D Le
(74) *Attorney, Agent, or Firm*—Bose Corporation (57) ABSTRACT

A seal consists of an annular thermoplastic body having a relatively thinner annular base and a relatively thicker, compressible annular bead. The annular body has a shape that corresponds to a mounting surface of a loudspeaker.

A surface of a rim of a loudspeaker basket is placed in contact with a mold to form a substantially annular cavity, a melted thermoplastic material is injected at low-pressure into the cavity to form a seal adhered to the surface.

3 Claims, 6 Drawing Sheets

U.S. PATENT DOCUMENTS

2005/0218694 A1  10/2005  Schoemann et al.

FOREIGN PATENT DOCUMENTS

| DE | 3424434 A1 | 10/1985 |
| --- | --- | --- |
| DE | 36 06166 A1 | 8/1987 |
| DE | 37 06 158 A1 | 9/1988 |
| DE | 195 01 292 A1 | 7/1996 |
| DE | 196 33 097 A1 | 3/1997 |
| DE | 196 26 813 A1 | 4/1997 |
| DE | 297 11 895 U1 | 9/1997 |
| DE | 197 13 897 A1 | 11/1997 |
| DE | 197 52 786 A1 | 6/1998 |
| DE | 197 40 400 A1 | 3/1999 |
| DE | 19928812 C2 | 12/2000 |
| DE | 10015751 A1 | 1/2001 |
| DE | 19957938 A1 | 6/2001 |
| EP | 0 552 040 A1 | 7/1993 |
| EP | 0 347 730 B1 | 2/1994 |
| EP | 0 552 040 B1 | 1/1996 |
| EP | 0 783 238 A2 | 7/1997 |
| EP | 0 783 238 A3 | 7/1997 |
| EP | 1059829 A2 | 5/2000 |
| EP | 1059829 A3 | 5/2000 |
| EP | 1059829 A2 | 12/2000 |
| EP | 1106438 A2 | 6/2001 |
| EP | 1106438 A3 | 6/2001 |
| EP | 1059829 A3 | 4/2003 |
| EP | 1257403 B1 | 6/2004 |
| EP | 1059829 B1 | 8/2004 |
| FR | 2633568 | 1/1990 |
| JP | 61105250 | 5/1986 |
| JP | H3-14724 | 1/1991 |
| JP | 03190712 | 8/1991 |
| JP | H5-95594 | 4/1993 |
| JP | 07186842 | 7/1995 |
| JP | H9-315235 | 12/1997 |
| JP | H10-136486 | 5/1998 |
| JP | 2000333290 | 11/2000 |

OTHER PUBLICATIONS

SolidBlue™ Hot Melt Dispensing Guns, Nordson Corporation, Issued Feb. 2005, Printed in the USA.

Santoprene™ TPV 111-45, http://catelog.ides.com/datashett.aspx?I=65890&PS=ASTM&E=18142, downloaded Jul. 6, 2005.

Santoprene™ Resource Library, http://www.santoprene.com/cgi-bin/resource_library/product_grade_exact.pl?entrypoint=IDES&pro..., downloaded Jul. 6, 2005.

Thermoplastic Elastomers, PTS—Thermoflex TPE/TPE-S (SEBS/SEPS), pp. 1-6, downloaded Mar. 6, 2006.

Borealis A/S, Polypropylene Daplen™ DSC65T20, Polypropylene Compound 20% Mineral Filled, Data Sheet.

EP Examination Report dated Apr. 22, 2009 for EP Appl. No. 07756916.8-1224.

European Office Action dated Sep. 7, 2009 for EP 07 756 916.8-1224.

International Search Report and Written opinion dated Nov. 28, 2008, issued in International Application No. PCT/US2007/06253, filed Feb. 13, 2007.

European Office Action dated Apr. 27, 2010 for EP 07 756 916.8-1224.

\* cited by examiner

LOUDSPEAKER GASKETING

BACKGROUND

This invention relates to loudspeaker gasketing.

Loudspeaker gasketing is sometimes used to control or prevent air flow through an interface between a loudspeaker transducer and a surface of an enclosure in which the transducer is mounted. Typical gaskets are made of foam or other compressible material. Liquid sealants such as caulk or epoxy are also sometimes used to seal the gap at the interface. Foam gaskets may be attached to the basket of the loudspeaker transducer using pressure sensitive adhesive, which is laminated to the foam material during a manufacturing process, prior to installation of the transducer. To make a good seal, the gasket must be aligned with the basket and carefully applied, sometime using a jig.

SUMMARY

In general, in one aspect, a seal consists of an annular thermoplastic body having a relatively thinner annular base and a relatively thicker, compressible annular bead. The annular body has a shape that corresponds to a mounting surface of a loudspeaker.

In general, in one aspect, an apparatus consists of a mold that has a central hole having a shape that corresponds to a basket of a loudspeaker and an annular cavity coaxial with the central hole. The annular cavity includes an annular groove that provides an annular enlargement of the cavity in an axial direction. The annular cavity has a shape that corresponds to a surface of the loudspeaker, and a feed hole that opens into the cavity.

Implementations may include one ore more of the following features. A second mold has a second central hole having a shape that corresponds to a second basket of a second loudspeaker and a second annular cavity coaxial with the second central hole. The second annular cavity includes an annular groove that provides an annular enlargement of the second cavity in an axial direction. The second annular cavity has a shape that corresponds to a surface of the second loudspeaker, and a second feed hole that opens into the second cavity. First and second jigs for supporting the first and second loudspeaker baskets are configured to be compliantly mounted to a common base plate.

In general, in one aspect, a surface of a rim of a loudspeaker basket is placed in contact with a mold to form a substantially annular cavity, a melted thermoplastic material is injected at low-pressure into the cavity to form a seal adhered to the surface, and the loudspeaker basket is removed from the mold.

Implementations may also include one or more of the following features. The seal is adhered to a loudspeaker. An injection-molding apparatus is inserted into the feed hole and configured to supply the thermoplastic material to the cavity at low pressure. The loudspeaker basket is positioned on a mounting surface with the thermoplastic material between the loudspeaker basket and the mounting surface, and is attached to the mounting surface. The attaching compresses the thermoplastic material to form a seal between the loudspeaker basket and the mounting surface.

In general, in one aspect, a loudspeaker is sealed to a mounting surface by applying a mounting force to cause a bead of an annular thermoplastic gasket that also includes an annular base that has a region broader than the bead and that is attached to a surface of the loudspeaker to be compressed between the surface of the loudspeaker and the mounting surface.

Other features and advantages will be apparent from the description and from the claims.

DETAILED DESCRIPTION

Figure 1A:
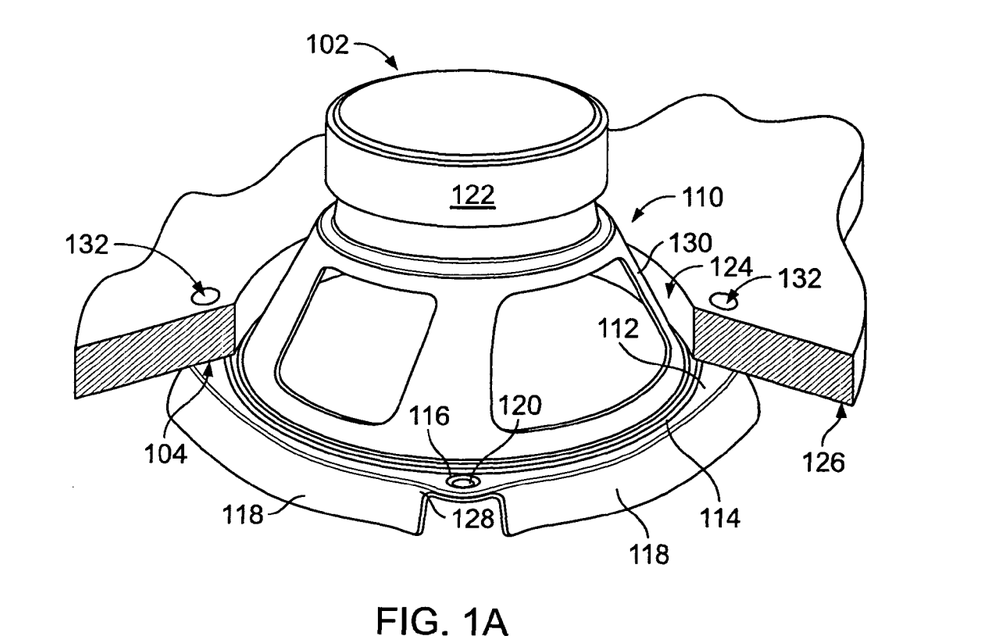
FIG. 1A is a perspective view of a speaker and a portion of an enclosure.
Figure 1B:
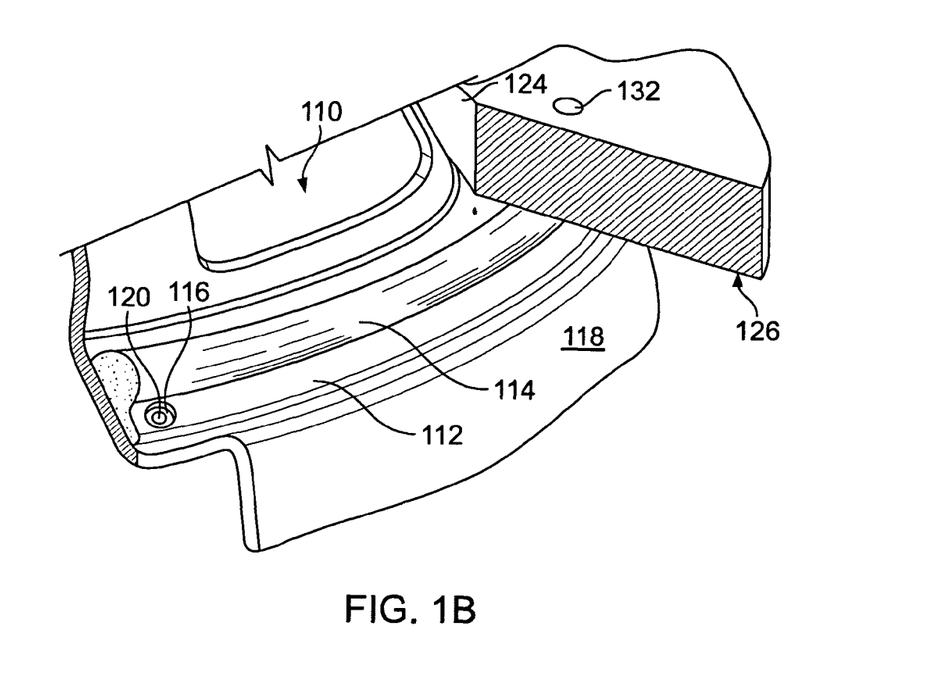
FIG. 1B is a perspective sectional view of a speaker and a portion of an enclosure.

As shown in FIGS. 1A and 1B, to enable sealing an interface 104 between a loudspeaker transducer 102 and a surface 126 of an enclosure such as a loudspeaker enclosure or a chamber in a door of a vehicle, prior to installation of the transducer through an opening 124 in the enclosure, a round, thin thermoplastic gasket 112 is low-pressure molded onto and adheres to a flat annular surface 128 of a rim of a basket 110 of the transducer 102.

Figure 4A:
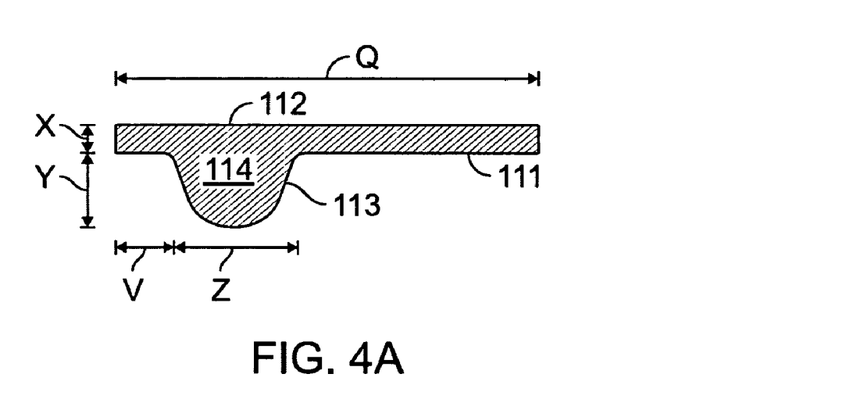
FIGS. 4A and 4B are cross-sections of a gasket.
Figure 4B:
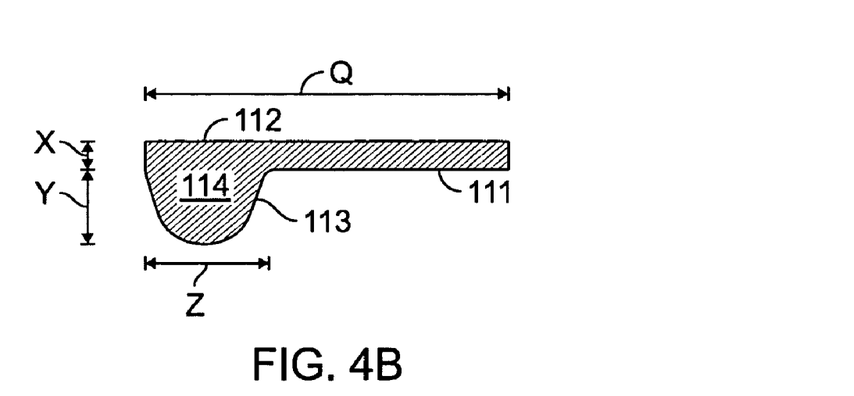
Figure 5A:
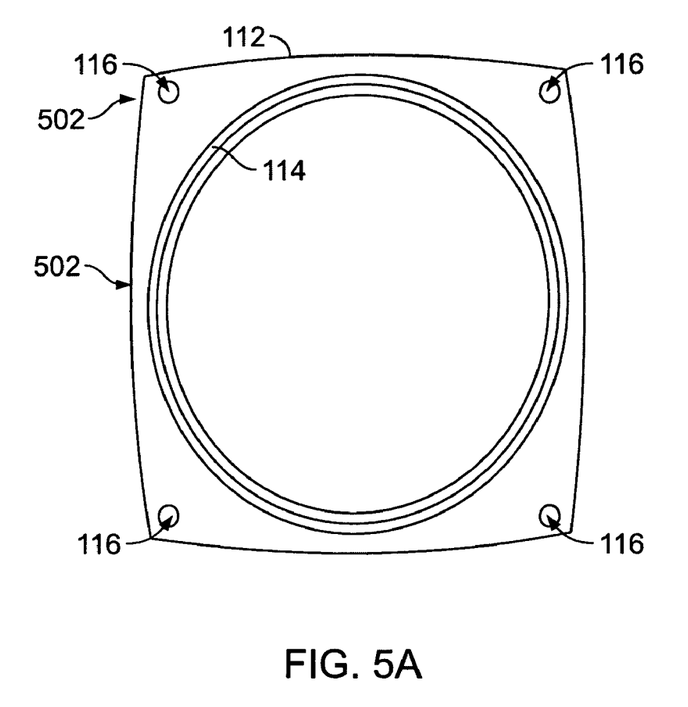
FIGS. 5A and 5B are top views of a gasket.
Figure 5B:
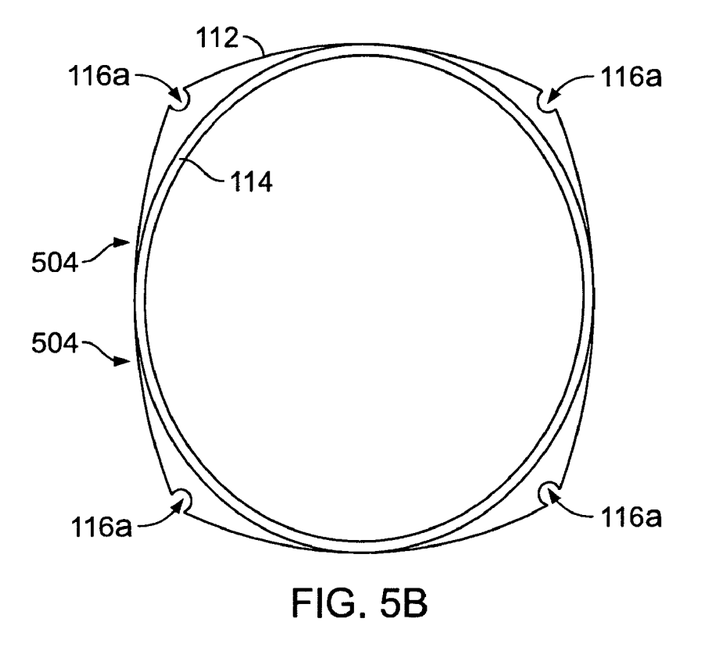

As shown in FIGS. 4A and 4B, the gasket 112 (which is an example of a seal) has a raised annular (in this case circular) bead 114 that has a thickness Y of about 2 mm, a radial width Z of about 4 mm, and a substantially semi-circular surface contour 113. The bead 114 is attached over at least some part of its circumference to a base 111 that has a thickness X of about 1 mm. In some cases the base may extend a distance V of about 2 mm inward from the inner edge of the bead. The raised bead 114 forms a circular ring of constant radial width around the base of the conical body 130 of the basket while the overall radial width Q of the base of the gasket may vary along its circumference to match the shape of the rim surface 128, for example, as shown in region 502 (FIG. 5A). The radial width Q may at some points match the radial width of the bead, such that there is no base separate from the bead itself as shown in region 504 (FIG. 5B). The rim surface 128 and the gasket 112 have several pairs of associated holes 120 and 116, or notches 116a (FIG. 5B) through which fasteners attach the basket to the loudspeaker enclosure through corresponding holes 132.

When the basket 110 is attached to the surface 126, the gasket 112 is held between the speaker enclosure and the rim surface 128, and the raised bead 114 is compressed by a mounting force between the loudspeaker enclosure and the rim surface 128, so that the gasket forms an air-tight seal between the speaker enclosure and the rim surface.

Figure 2:
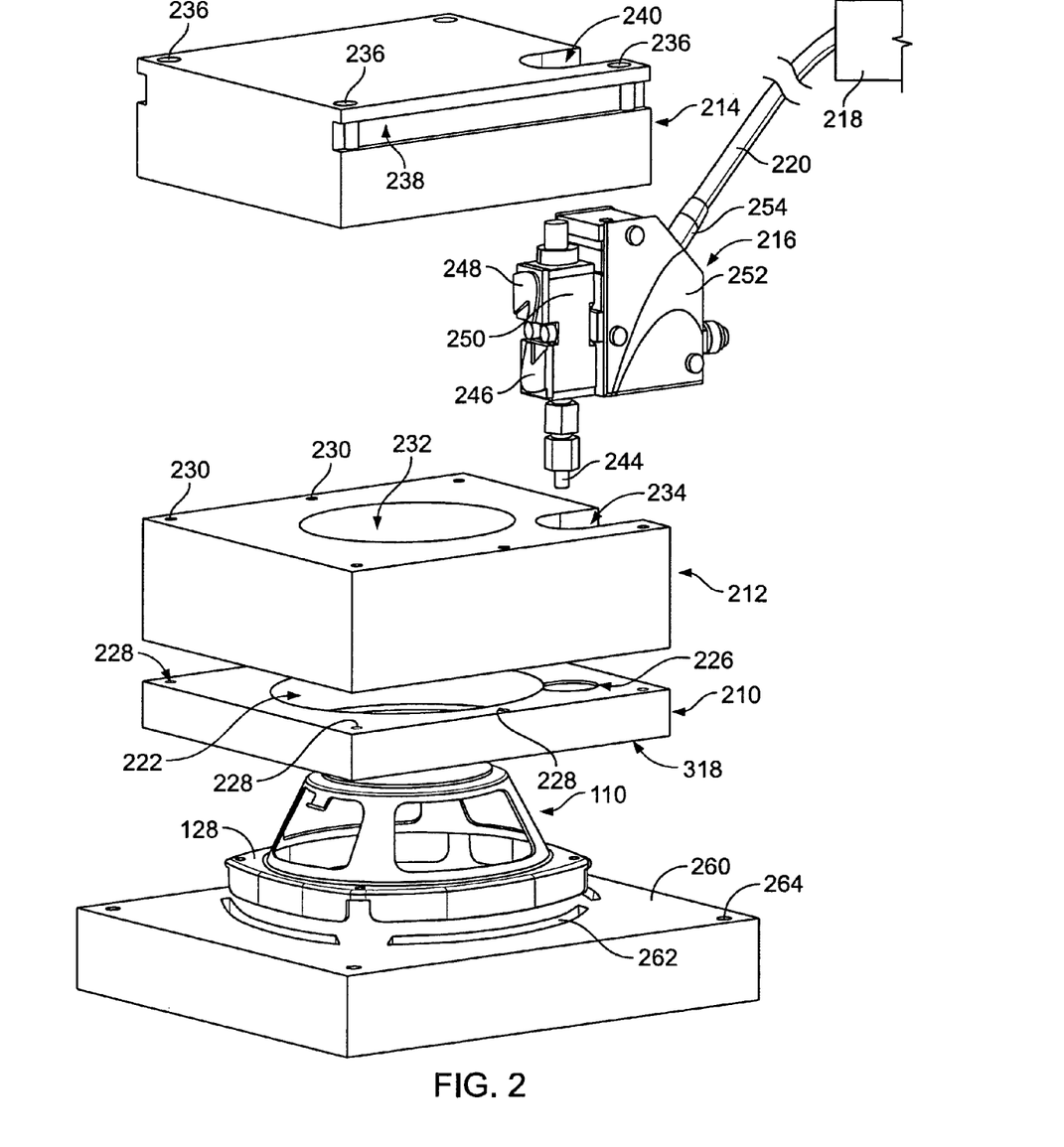
FIGS. 2 and 3A are opposite perspective views, exploded, of a speaker and components of a molding machine.
Figure 3A:
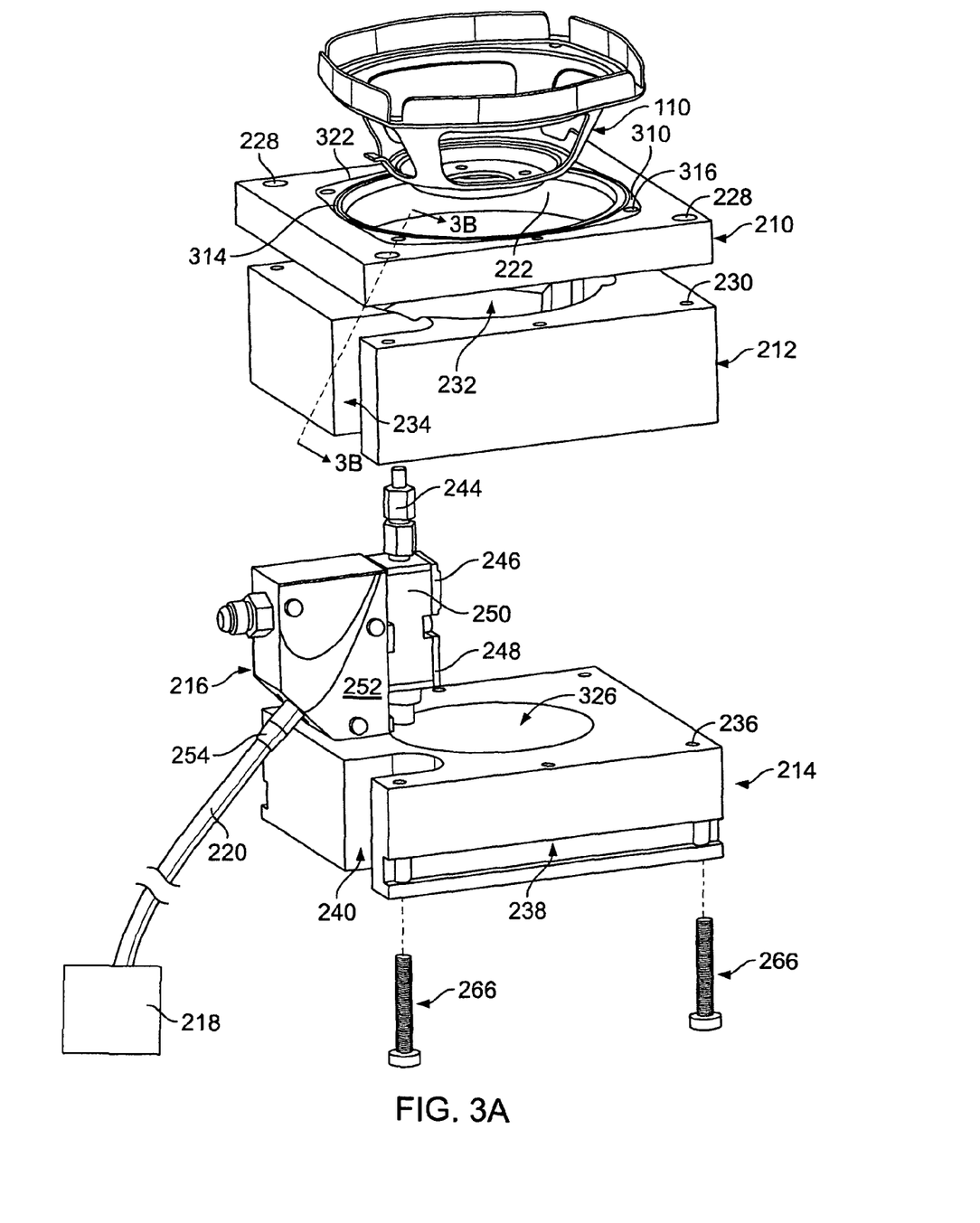
Figure 3B:
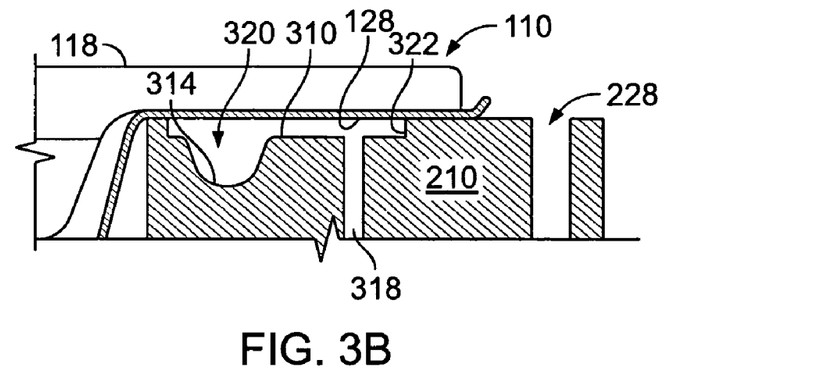
FIG. 3B is a side sectional view of a portion of a speaker and a mold.

As shown in FIGS. 2, 3A, and 3B, the gasket 112 is formed and adhered to the rim surface 128 of the basket 110 in a molding machine by low-pressure injection molding a hot melt adhesive (not shown) into a cavity 320 temporarily formed between the rim surface 128 and an inner surface 310 of a mold 210. The cavity includes a groove 314 and rings 316 corresponding to the bead 114 and the holes 116 to be formed in the gasket. A peripheral wall 322 of the mold cavity has a contour similar to the outer contour of the rim surface 128 so that the molded gasket will have an outer edge of similar shape to but slightly indented from the periphery of the rim surface 128.

The mold 210 also includes a fill hole 318 (obscured in FIG. 2) connecting the cavity 320 to an opening 226 for a nozzle 244 of an injection molding gun 216, an opening 222 to accommodate a conical body 130 of the basket, and holes 228 to facilitate securing the mold to other parts. (The mold 210 and other elements held in the molding machine are shown right side up in FIG. 2 and upside down in FIG. 3A.)

The injection molding gun 216 is held in channels 234 and 240 in a mounting block 212 and a spacing block 214, respectively, with the nozzle 244 projecting into the opening 226 in the mold 210. The gun 216 includes a gun body 252, a hose coupling 254, and an injection module 250 with protective covers 246, 248. The thermoplastic adhesive (not shown) is melted in a melter 218, supplied to the gun 216 through a hose 220, and injected at low pressure (about 400-600 psi, preferably 500 psi) by nozzle 244 through the fill hole 318 into the cavity 320 to form the gasket 112. The pressure needed depends on the design of the cavity and the mold flow characteristics of the material selected for the gasket. When hot, the melted thermoplastic material flows around the cavity to form the complete gasket.

Once the thermoplastic material fills the cavity and begins to cool, the liquid adhesive is constrained from flowing into the cavity. The pump is operated for a fixed amount of time, e.g., 1 sec., calculated to deliver the correct amount to form the gasket. The material is cooled in the mold by chilled water flowing through cooling tubes embedded in the mounting block 212 (not shown). After a short delay period, dependent on the design of the gasket, during which the material has cooled to form a finished hardened gasket, the mold 210 is automatically lifted away from the jig 260 by the molding machine. A thicker gasket will have a greater volume-to-surface-area ratio and require a longer cooling time than a thinner gasket.

The finished gasket adheres to the rim surface 128, but can be easily peeled away if the gasket is formed improperly or later damaged. Scrapped gaskets and other waste material can be returned to the melter 218 to be re-melted and used to form other gaskets.

In the molding machine, a jig 260 (FIG. 2) that includes slots 262 to accommodate flanges 118 of the loudspeaker basket holds the basket of the loudspeaker against the mold, as shown in FIG. 3B, to form the cavity 320 during molding. During operation, the molding machine holds the jig separately from and below the mold and can lower the mold onto the jig and lift it again under automatic control or control by a worker. The molding machine could be modified to accommodate an entire loudspeaker assembly instead of only the basket.

To prepare for molding, with the mold lifted to its upper position, a worker places a speaker on the jig with the flanges 118 in the slots 262. The worker then triggers the machine to begin the molding process. The machine lowers the mold onto the speaker, triggers the flow of thermoplastic material, shuts off the pump, delays until the gasket has solidified, and then lifts mold jig so that the worker can remove the gasketed loudspeaker from the jig. The gaskets are formed quickly because the worker need only place the speaker on the jig and trigger the machine.

The mounting block 212 includes a hole 232 to accommodate the conical body 130 of the basket 110 and holes 230 corresponding to holes 228 in the mold 210. The spacing block 214 includes a cavity 326 to accommodate the conical body of the basket, holes 236 corresponding to holes 230 in the mounting block, and grooves 238. The cylinder spacing block, mounting block, gasket mold, and jig are aligned by pins 266 through holes 236, 230, 228, and 264.

The jig 260 and the mold 210 are made of stainless steel if the basket 110 may include magnetic material such as magnet 122 (FIG. 1). The surface 310 forming the cavity 320 is coated with a non-stick coating such as Magnaplate(tm) TNS produced by General Magnaplate of Linden, N.J.

In some examples, a Nordson VersaBlue™ hot melt unit (not shown in sketches) is used to melt and act as the reservoir for the material. The material travels through a heated hose and is injected through (252) a SolidBlue™ dispensing gun, part number 1052927A, connected to a (250) SolidBlue™ hot melt dispenser tip, part number 1052713A, both made by Nordson(r) of Westlake, OHIO. The injection nozzle (244), part number MM80-A-90-0 (supplied by Cavist Corporation, Reno, Nev.) is attached to the 250 SolidBlue™ hot melt dispenser tip. The thermoplastic material is H5141-K0 I hot melt adhesive by Bostik Inc., of Wauwotosa, Wis. It is heated to a temperature of between approximately 400-450, preferably 425° F. The mold temperature is controlled by a Polyscience chiller model no. 6206. The molding process is carried out in a Cavist Mold-Man(tm) 8200.

Figure 6:
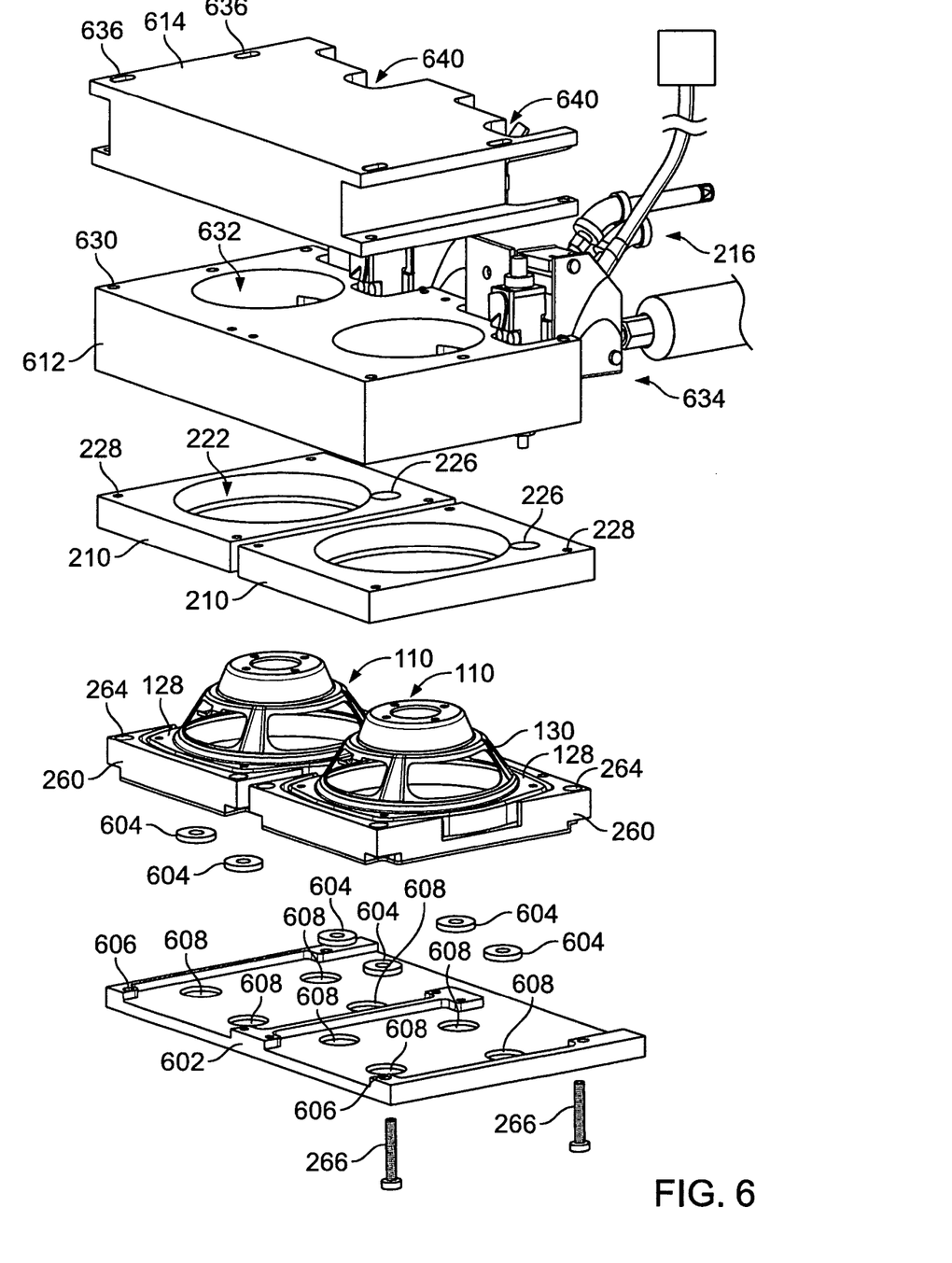
FIG. 6 is a perspective view, exploded, of two speakers and components of a molding machine.

FIG. 6 shows a two-up tool 600 to mold gaskets. A two-up tool takes increased advantage of the molding apparatus by placing 2 (or more) mold cavities 210 and jigs 260 side by side within the clamp envelope of a single molding machine. One benefit of two-up processing is to cut the molding cycle time in half, effectively doubling output capacity and increasing the utilization of a single molding machine. The additional cost of two-up tooling (over single cavity tooling) is lower than the cost to duplicate an entire (single cavity) molding cell.

In the molding process, it is desirable to maintain uniform clamping pressure between each basket 110 and the corresponding mold 210, applied over the entire rim 128 of the basket(s). Uneven or insufficient clamp pressure may allow the pressurized molten gasket material to squeeze past the basket-to-mold interface causing a defect. In a two cavity tool, basket material thickness variation from part to part can cause a clamp height mismatch between the two tandem tool cavities when they are mounted to a common base plate 602 within a single clamp mechanism (not shown). This mismatch can result in non-uniform clamp pressure. To eliminate this condition, the jigs 260 that support the baskets 110 under clamp load are allowed to "float" independently of one another. This is accomplished by using two individual jigs 260 on a common base plate 602 and placing compliant devices, such as polyurethane springs 604, between each jig 260 and the base plate 602. A set of depressions 608 hold the springs 604 in place. This arrangement effectively accounts for basket thickness variation and balances the pressure applied to each cavity of the tool.

A mounting block 612 and spacing block 614 are used in the same manner as the mounting block 212 and spacing block 214 in FIGS. 2 and 3A. Several holes 606, 630, and 636 in the base plate 602, the mounting block 612, and the spacing block 614 respectively correspond to the holes 228 in the molds 210 and 264 in the jigs 260 to accommodate pins 266 to hold the parts together in the mode apparatus 600. Holes 632 accommodate the conical bodies 120 of the baskets 110. Channels 634 and 640 in the mounting block 612 and spacing block 614 align with the openings 226 in the molds 210 and accommodate a pair of injection molding guns 216 as in the single-cavity example.

Advantages of the loudspeaker gasket described and claimed here include decreases in assembly time, proper alignment without a jig or other alignment aid, and reductions in cost. Assembly time is reduced because an operator is not required to position a separate gasket on the loudspeaker. No jig or other alignment aids are required because the gasket is formed in place with relatively little intervention. Cost is reduced through the elimination of manufacturing steps such as the application of adhesive or removing a backing and placing and attaching a separate gasket. In addition, opportunities for misapplied gaskets are reduced because the gasket is molded in-place, and the location of the gasket is fixed by the molding tool. Damaged or otherwise unusable gaskets can be easily removed without damage to the loudspeaker, and the scrap material can be re-used, as the material adheres to the basket sufficiently to allow the transducer to be mounted in the enclosure without movement of the gasket, but does not adhere so strongly that it cannot be easily removed. There is no wasted material. Unused material can be re-melted and re-used. When in liquid form, the hot-melt material used to form the gasket is contained and is less likely to create messes in the assembly area or contaminate other parts of the loudspeaker or enclosure. Less waste is produced than if the gasket were formed by cutting a ring from a sheet of foam or other material. Compression of a raised bead formed in the molded gasket, located between the loudspeaker and the enclosure, allows a sealed interface with more uniform alignment, and improved sealing over slightly irregular surfaces.

Other implementations are within the scope of the claims. For example, the thermoplastic material may be injected at multiple points in the cavity, the speaker gasket may be configured in other shapes, and other techniques may be used for dispensing the thermoplastic material.

What is claimed is:

1. A method comprising
placing a surface of a rim of a loudspeaker basket in contact with a mold to form a substantially annular cavity,
low-pressure injecting a melted thermoplastic material into the cavity to form a seal adhered to the surface, and
removing the loudspeaker basket from the mold.

2. The method of claim 1 also comprising
positioning the loudspeaker basket on a mounting surface with the thermoplastic material between the loudspeaker basket and the mounting surface, and
attaching the loudspeaker basket to the mounting surface.

3. The method of claim 2 in which the attaching compresses the thermoplastic material to form a seal between the loudspeaker basket and the mounting surface.

\* \* \* \* \*